(12) United States Patent
Neal (10) Patent No.: US 11,624,387 B2
(45) Date of Patent: Apr. 11, 2023

(54) WALL ANCHOR FOR CART WITH RECHARGING

(71) Applicant: TAGCarts, Inc., Sacramento, CA (US)

(72) Inventor: Taggart Neal, El Dorado Hills, CA (US)

(*) Notice: Subject to any disclaimer, the term of this patent is extended or adjusted under 35 U.S.C. 154(b) by 0 days.

(21) Appl. No.: 17/172,508

(22) Filed: Feb. 10, 2021

(65) Prior Publication Data
US 2021/0164507 A1 Jun. 3, 2021

Related U.S. Application Data

(63) Continuation of application No. 16/212,312, filed on Dec. 6, 2018, now Pat. No. 10,927,873.

(51) Int. Cl.
*H02J 50/10* (2016.01)
*F16B 5/12* (2006.01)
*F16B 13/08* (2006.01)
*H02J 3/46* (2006.01)

(52) U.S. Cl.
CPC ............ *F16B 5/12* (2013.01); *F16B 13/0833* (2013.01); *H02J 50/10* (2016.02); *H02J 3/46* (2013.01)

(58) Field of Classification Search
USPC ......................................................... 320/108
See application file for complete search history.

(56) References Cited

U.S. PATENT DOCUMENTS

| | | | | |
|---|---|---|---|---|
| 4,367,517 A | * | 1/1983 | Balzer .................. | E04F 11/1804 362/306 |
| 5,773,954 A | * | 6/1998 | VanHorn ............. | G06K 7/10722 320/137 |
| 2008/0169910 A1 | * | 7/2008 | Greene ................... | H02J 50/70 340/10.34 |
| 2008/0231228 A1 | * | 9/2008 | Fowler ................. | H02J 7/0042 320/107 |
| 2017/0214262 A1 | * | 7/2017 | Jones ........................ | H02J 7/02 |

* cited by examiner

*Primary Examiner* — Bryce M Aisaka
(74) *Attorney, Agent, or Firm* — Heisler & Associates (57) ABSTRACT

The system includes a rail mountable to a wall, such as a wall along a hallway in a medical care environment. A cart movable along a floor adjacent to the wall is fitted with an anchor. The anchor is located at the rail, the anchor configured so that it releasably engages the rail, so that the cart can be secured to the rail when not in use. In at least some embodiments, a power source is located within the rail and a power coupler is provided on the cart which is adjacent to the power source in the rail and electrically coupled to the power source, for transmission of power from the power source in the rail to the cart, when of the anchor on the cart is attached to the rail. Thus, the cart is both anchored and recharged simultaneously in such embodiments.

26 Claims, 5 Drawing Sheets

Fig.16  Fig.17

WALL ANCHOR FOR CART WITH RECHARGING

CROSS-REFERENCE TO RELATED APPLICATIONS

This application is a continuation of U.S. patent application Ser. No. 16/212,312 filed on Dec. 6, 2018, which claims benefit under Title 35, United States Code § 119(e) of U.S. Provisional Application No. 62/596,504 filed on Dec. 8, 2017 and U.S. Provisional Application No. 62/691,247 filed on Jun. 28, 2018.

FIELD OF THE INVENTION

The following invention relates to medical carts and other carts which move upon a floor. More particularly, this invention relates to systems for anchoring medical carts and similar carts at various locations adjacent to a wall, and also for conveniently re-charging power systems of such carts or otherwise supplying power to such carts.

BACKGROUND OF THE INVENTION

In hospitals and other medical environments medical carts have become highly useful to support the work of medical practitioners. Medical carts can store portable diagnostic equipment, medications, patient record documents, computers and other electronic devices (which may or may not access a patient support data network) and a nearly limitless assortment of other supplies and equipment. By placing the most commonly used items on such a cart, and because the medical environment already has hard floors for supporting wheeled structures such as hospital beds and other portable equipment, the medical cart provides a convenient way to keep these items in an easily accessible location close to where they are needed.

Typical medical carts include a wheeled base and a stand extending up from this wheeled base, with various different structures coupled to this stand which are provided to maximize the usefulness of the cart. Some carts can be general purpose including a combination of drawers for containing items, as well as surfaces upon which items can be rested, and arms which support computer monitors, etc. in various locations. Other medical carts can be special purpose carts, such as a medication cart which primarily only houses medications and associated equipment. Because the cart is on wheels, a medical practitioner can keep the cart close by so that items contained or supported by the cart are immediately available when needed. The cart can keep these items sanitary, keep these items close to the medical practitioner to avoid extra travel and time for the medical practitioner (to otherwise retrieve necessary items), and can keep items secure, especially items which are prone to theft or misuse, or are fairly commonly misplaced.

While the simplest medical carts do not include a source of power, many medical carts benefit from supplying power in a portable fashion, so that users further do not need to plug in powered equipment, but rather the equipment which requires power can merely remain plugged into the cart. For instance, a computer on the cart can be powered from a portable power supply on the cart, so that the computer avoids needing to be recharged or plugged into power separately. Personal mobile devices ("PMDs") such as tablets, smartphones, etc. can also be powered and/or recharged by connecting (by power cable or wirelessly by inductance) such PMDs to the cart. Typically such onboard power supplies on medical carts are powered by batteries which have sufficient capacity to provide the power requirements of the items typically connected into this power supply borne by the cart. The batteries allow the cart to move about without a cord coupled to the wall. Often such batteries are mounted low on the cart to keep a center of gravity of the cart low and resist potential for tipping of the cart. Sometimes these batteries are affixed to the cart in a more permanent fashion requiring tagged out maintenance to change out said battery. Other times these batteries are swappable or modular in nature and required healthcare professionals to "change-out" or "swap" said batteries from the cart to a charging station where one or more batteries charge before swapping back to a cart. The cart can include power outlets so that miscellaneous items can be plugged into the cart for charging thereof, including standard power receptacles and specialty receptacles such as USB ports or designated charging areas on the cart top surface (and/or sides, back, front) for the charging of tablets, smart phones, and other devices fitted with USB connectors.

With the success of medical carts in enhancing the effectiveness of medical professionals, medical carts have multiplied within the hospital and other medical care environments (and in non-medical environments as well). However, various problems have been created or exacerbated as a consequence. For instance, carts can be abandoned (at least temporarily) and clutter hallways and other spaces within the medical care environment. Furthermore, in an earthquake or other seismic event the carts have the potential to become dangerous moving objects, especially larger carts with heavy batteries and other heavy equipment. If the wheels lock, the carts can still move by skidding on the wheels or toppling over. Furthermore, medical carts which include a power supply thereon require periodic charging. Thus, recharging becomes an additional procedure that is required before the cart can be effectively utilized. If personnel do not plug in the cart regularly, or monitor, maintain and manage the modular or swappable battery power system, the cart might fail to have necessary power at some critical moment and jeopardize patient care. Accordingly, a need exists for simple and effective methodologies to simplify the recharging of powered medical carts and also to anchor medical carts when not in use. Beneficially, such problems might be solved in an integrated solution to maximize convenience and effectiveness.

SUMMARY OF THE INVENTION

With this invention, a recharging docking assembly is provided which, in one embodiment, provides both anchoring of a medical cart to keep it from moving during seismic events and also allows the medical cart to be conveniently charged, either when not in use or when in use adjacent to a wall or other structure which accommodates the docking assembly. The docking assembly generally includes two mating parts, one of which is on a rear of the cart (or elsewhere on the cart) and the other of which is mounted to a wall (or other stationary structure). The stationary portion in a preferred embodiment is an elongate horizontally oriented docking structure mounted to the wall. This docking structure (also called a "rail") preferably maintains substantially constant elevation above the floor and is preferably elongate in form.

In some embodiments, this elongate dimension could be a relatively small amount, such as one foot, so that the user would need to locate the docking assembly and provide some limited alignment of the medical cart and associated latch on a rear of the cart with the dock assembly, so that they could be mated together, but mating can occur with the latch of the cart anywhere along the length of the docking structure. However, in a most preferred embodiment, the dock assembly has significant length, such as being continuous along many walls or other vertical structures within a medical care environment, somewhat similar to a "chair rail" or similar trim is often provided at a constant elevation above the floor (such as a bumper to protect the walls from impacts). Such a substantially continuous or largely continuous docking assembly allows for the cart to be docked and optionally anchored at nearly any location adjacent to a wall of the medical care facility. With high convenience, a higher likelihood exists that most carts (and all unused carts) will be recharged regularly, and also (in options including a seismic anchor) be anchored when an earthquake strikes.

Whether the docking assembly is provided in shorter lengths or substantially continuous (or some intermediate length) this docking assembly provides at least one of two functions in various embodiments. First, this docking assembly benefits from having the docking assembly provide power when a cart is coupled to the docking assembly, so that batteries for the medical cart can be recharged and/or power supplies and equipment on the medical cart can be utilized while the cart is effectively plugged into power through the docking assembly. Additionally, in a most preferred embodiment, the docking assembly acts as one portion of the anchor assembly to hold a medical cart adjacent to the wall or other vertical structure, so that it does not move relative to the wall or other vertical structures in an earthquake or other seismic event.

A particular embodiment is disclosed herein to effectively provide both such anchoring and power delivery to medical carts coupled to the docking assembly. With this docking assembly an upper flange and a lower flange extend horizontally and perpendicularly away from the wall. A gap between these upper and lower flanges is sized sufficiently large to receive a power latch (or merely a "latch" for anchor systems which do not include electric power) within this gap between the two flanges. The two flanges and gap together can be referred to as a power clasp (which can be unpowered in embodiments where no power is supplied, but rather only anchoring). Preferably, the clasp is configured so that the flanges have lips at distal tips thereof which extend toward each other to narrow the gap at a portion of the gap most distant from the wall. Power pads are provided on the upper and lower flanges, typically with these power pads in the form of elongate buses, as long as the docking assembly, and acting as contacts to make electrical connection with portions of the cart associated with a latch thereof, when the cart is located adjacent to the power clasp.

In this embodiment, electrical connection is made simultaneously with the latching of the cart to the docking assembly, so that both holding of the cart to prevent movement during a seismic event is provided, as well as supply of power to the cart. The lips both help to keep the anchor assembly secure, such as during a seismic event, and also conceal and hide the power pads sufficiently to substantially prevent potential for an individual to touch the power pad, to potentially be harmed by transmission of electric power to the individual, such as to fingers of the individual. If necessary, a door could span this gap adjacent to the lips which door could be spring loaded to allow latch insertion into this gap for charging thereof, but to block fingers. In other embodiments, voltages associated with the power clasp can be sufficiently low or other characteristics of the electric power can be selected so that the risk of injury is sufficiently diminished. As a further alternative, dimensions for locations of the power pad can be selected which exceed typical dimensions of human fingers, so that the fingers of an individual cannot effectively reach the power pads for potential injury.

An outer surface of the upper and lower flanges forming the power clasp can be rounded and/or fitted with padded materials, so that if an individual bumps into this structure, no injury is received. In one alternative, the docking assembly including the power clasps can be elevated above the floor height similar to that of a chair rail, so that the power clasps associated with the docking assembly double as a chair rail/bumper to protect walls of the medical facility, and to at least some extent conceal the anchor assembly by disguising it as what appears to be a chair rail, when in fact it is part of the anchor assembly. In other embodiments, the docking assembly could be just above or just below such an existing "chair rail" structure.

The anchor assembly also includes particular power latch equipment (or latch equipment without power for unpowered carts) located on the rear of the cart and at an elevation on the cart matching an elevation of the docking assembly including the upper and lower flanges of the power latch. This power latch can be built into the cart or retrofitted onto existing carts and is designed to extend from a rear of the cart in a horizontal fashion, and with a size of the latch selected so that it can fit into the gap between the flanges of the power clasp in the docking assembly.

The power latch preferably has a pair of wings which extend upwardly and downwardly from a central horizontal post of the power latch. These wings are preferably spring loaded and biased to extend diagonally away from this central post in an upward and downward manner, somewhat similar to the appearance of an arrowhead in this embodiment. These wings include distal tips which include positive and negative power contacts (or other power contacts) which are positioned so that they come into contact with the power pads within the power clasp when the medical cart is anchored to the docking assembly.

In addition to power, these contacts on the wings could also include data transmission contacts, such that both power and data (or merely data) can be transmitted. While often carts can benefit from wireless transmission of data, in some situations such wireless transmission might not be appropriate for confidentiality purposes, or in medical environments where wireless transmission is incompatible with associated medical equipment or otherwise undesirable. Furthermore, such non-wireless data transmission can act as a back up should a wireless network become non-operational.

The wings of the power latch, while biased toward a position extending up and down from the central post, can be flexed inwardly to pivot into a hollow interior of this central post, so that the wings can essentially collapse and an overall size of the power latch can match an overall size of the central post when these wings are so collapsed. However, spring forces (or other biasing forces) will cause the wings to return to their upwardly and downwardly extending biased positions when collapsing forces are removed.

In one embodiment, to bias these wings in this manner, the wings are pivoted near a distal tip of the central post and a torsion spring (or springs) is provided adjacent to a pivot pin holding the wings to the central post, which spring acts on the wings to cause the wings to pivot away from the central post, except when sufficient forces are acted upon the wings to act against the spring and collapse the wings into the central post.

With such a configuration, the medical cart can be pushed so that the power latch comes adjacent to the gap in the docking assembly on the wall or the vertical structure. The lips extending up and down from the upper and lower flanges of the power clasp of the docking assembly encounter these wings and cause the wings to be flexed and collapsed into the central post as the medical cart is further advanced, so that the central post extends further into this gap between the flanges of the power clasp of the docking assembly.

Once the center post has extended sufficiently far into this gap that the wings travel past the lips, the biasing forces acting on the wings cause the wings to pivot away from the central post so that the contacts on the wings come into contact with the power pads of the docking assembly and associated power clasp. Electrical connection is thus provided.

Furthermore, with the wings so pivoted outwardly, if the cart is pulled away from the wall or other vertical structure, distal tips of these wings will abut the insides of the lips of the upper and lower flanges of the docking assembly and prevent removal of the cart from the docking assembly. The cart is thus held tightly to the wall or other vertical structure. In an earthquake or seismic event, forces acting on the cart which might tend to cause the cart to move away from the wall will be opposed by these wings on the central post of the power latch of the cart abutting against the lips of the flanges of the power clasp of the docking assembly, and keep the cart from moving relative to the wall. Thus, the anchor assembly effectively acts as a seismic anchor, keeping personnel and other equipment safe from impacts which might otherwise occur with the medical carts. The contacts on the wings and the power pads are sized so that they come into contact with each other and maintain contact as long as the power latch remains within the power clasp.

The central post of the power latch extends horizontally from rear of the cart and is preferably rigidly affixed to the rear of the cart (either as permanent original equipment on the cart or as a retrofit kit to be affixed to an existing cart). A release rod is coupled through links to the wings. These links are pivotably attached to the release rod which extends down a center of the post, with the rod coupled to the wings through these links. When the release rod is pulled in a horizontal fashion, the associated links pull on the wings, causing the spring or other biasing of the wings to have its forces overcome and causing the wings to be retracted. This release rod is itself spring loaded so that it is biased against release of the wings. However, when the release rod is pulled with sufficient horizontal force to overcome this biasing spring (or other biasing structure), it can translate horizontally and caused the wings to retract. Thus, the user can pull on this release rod, such as by pulling on a release knob at an end of the release rod on the front (or a side) of the cart, and cause the wings to retract, and allow the cart to be moved away from the wall. As an alternative, a solenoid or other displacement electro-mechanical device could act on the release when a release button is actuated by a user, so that release of the cart for movement can be provided when desired. After release of the power latch and movement of the cart, a user can then let go of the release rod, and the bias spring or other biasing structure associated with the release rod will return the release rod to its original position, and return the wings to their last position extending up or down from the central post of the power latch.

Data transmission connections can be provided through the power latch and power clasp. As an alternative, separate data interfaces could be provided on separate locations on the rear of the cart and on the wall or other vertical surface, which come into contact when the cart is docked through the power latch to the docking assembly.

The overall anchor assembly depicted in one embodiment herein is merely one of many different anchor assemblies which could be designed to provide the basic function of a removable anchor which allows a cart to be anchored to a wall or other vertical structure. Basic elements which would typically be provided in alternative embodiments would include the docking assembly (e.g. a "rail") of either limited or extensive length and a latch assembly (e.g. an "anchor") on a rear of a cart, with the latch assembly and docking assembly located a similar height above a floor. In some embodiments, the latch and docking assembly benefit from being lockable merely by driving the cart up against the wall and bumping into the docking assembly until latching occurs. The latch can be optional in one embodiment, so that the cart can be recharged without latching or recharged with latching, at the option of the user. Status lights can communicate the state of the cart as charging and latched, charging but not latched, latched but not charging or neither latched nor charging.

Beneficially in certain embodiments, power contacts are associated with the latch assembly and docking assembly so that power to the cart occurs when docking has been achieved. The cart can be fitted with status lights which indicate and confirm secure docking and that charging is underway, so the personnel have confidence that the cart has been safely docked (and optionally anchored) and that the cart is being charged for future use. The particular details of the latch and lock assembly to achieve secure temporary connection, to allow for release, and to allow for power supply therebetween could vary in different embodiments, with the embodiments depicted herein provided as examples.

Figure 6:
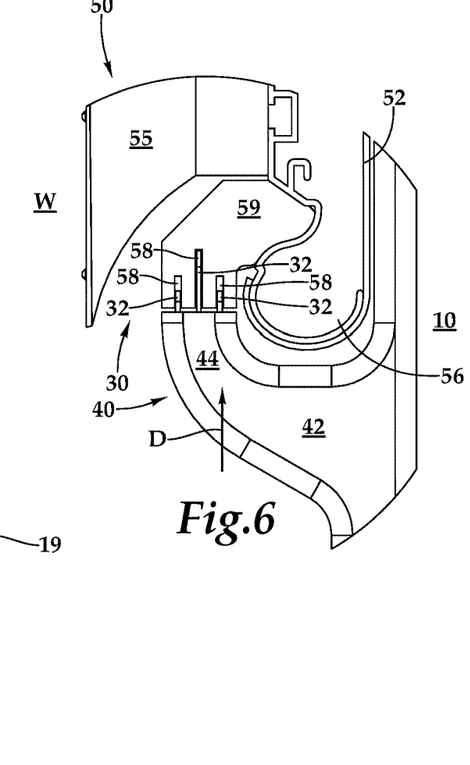
FIG. 6 is a detail a portion of that which is shown in FIG. 4, and illustrating one system for providing electrical connection and anchoring between the cart and the rail.

For the docking assembly to deliver power to a power receiver of the cart, various different power transfer configurations can be provided, other than those already described above. Three such power transmission systems are shown in FIG. 6 and further described both in FIG. 6 and herein. With an option A, a contactless electric power transmission is facilitated between either a single location on the wall or a continuous rail structure on the wall, which is either truly continuous between ends thereof, or merely has a large number of regularly spaced charging locations. Visual markings can be provided so that the cart can be properly located for charging. A charging light on the cart, on the wall, or at both locations, can indicate that a proper contact has been made and that charging is occurring. To facilitate such contactless power transmission, in one embodiment inductive coils within the docking assembly and within the power receiver can be complementarily provided so that when they are brought into proximity with each other, power transfer is achieved. Other forms of contactless charging could also alternatively be provided. If desired, magnets could be utilized to hold the cart in proper position with the power receiver properly aligned with appropriate portions of the docking assembly, for optimal power transmission to the cart and recharging batteries associated therewith, or for running electric power equipment directly. Physical contact can be facilitated, such as by magnets or other connectors in one embodiment, with power transmission still occurring through inductance or other non-contact power transmission, or contact can be utilized for conducting electricity to the power receiver of the cart.

In an option disclosed herein, a physical hardware latch and docking can be provided, such as with appropriately complementarily formed structures on the docking assembly and the power receiver, and optionally with doors or other movable covers covering electrically conductive surfaces, such as to keep contacts free of dust and debris, and to otherwise protect the contacts and to potentially protect from injury.

A further option can also be provided in the form of contacts which come into contact with but do not physically connect, and allow for power transmission therebetween, and which typically would include a relatively strong magnet to attract a perimeter of a power receiver on the cart to an area surrounding corresponding contacts in the docking assembly. When the power receiver is brought close to the docking assembly, the magnets pull in the cart slightly and complete the circuit between contacts on the power receiver and contacts on the wall. By utilizing low-voltage, these contacts can potentially be left exposed safely. As another alternative, a removable cover can be provided over such contacts on the docking assembly and/or the power receiver on the rear of the cart. As a further alternative, the docking assembly can be configured so that electric power is not supplied to contacts associated therewith until proximity of the cart is detected by a cart proximity sensing system, and then electric power is allowed to flow to the docking assembly and onto the cart and battery associated therewith, or directly to equipment located upon the cart.

With each of these options, the docking assembly maintains a constant distance above the floor and a corresponding power receiver on the cart is provided at a corresponding similar height above a bottom of the cart. Thus, and with the docking assembly provided with an elongate length associated therewith, very little aligning is required. Rather, merely a rear side of the cart (or optionally a side thereof) need be brought adjacent to the docking assembly on the wall, and charging can be initiated (along with optional anchoring as well).

In one embodiment, following the system such as that disclosed in an option above, while physical contact and connection is involved, the power receiver on the cart utilizes electrically conductive blades which are oriented within horizontal planes and fit within horizontally extending slots. These slots are elongate in length so that connection of the power receiver to the elongate slots in the docking assembly can occur at a variety of different locations spaced horizontally from each other.

Furthermore, if the cart is bumped laterally, the power receiver is not damaged, but merely would pivot out of the slots and become disconnected. A charging light indicating that charging is occurring would typically go out, and perhaps a warning tone could be emitted as a reminder to reengage the power receiver with the slots in the docking assembly. With such a configuration, even if the cart is charging in a hallway, in an emergency the cart can be rapidly moved out of the way, or rapidly grabbed and used to assist in patient care, because it can be quickly and easily removed from the docking assembly and utilized as desired, and without concern for the cart becoming a permanent physical obstruction within the hallway.

Similarly, when magnetic attraction is utilized to align the power receiver with the docking assembly and areas on the docking assembly are required, such as for contactless power transmission, such magnets would only provide a very light attractive force. Such light force would keep the cart in position for charging when no other forces are applied to the cart, but could be easily overcome in an emergency to allow the cart to be quickly moved out of the way or for the cart to be quickly utilized, without needing to "carefully unplug the cart" as would be the case with prior art recharging cords. Furthermore, the benefits of avoiding cords, such as trip hazards, and sanitation issues, are beneficially avoided. Additionally, a "break-a-way" docking station would eliminate other modular and swappable mobile medical cart power systems' maintenance, management, and monitoring of power supplies and their required charging stations where these portable batteries are charging in centralized or single locations.

While the docking assembly could be permanently installed along a wall where carts are to be placed during charging, as an alternate, the docking assembly could be a separate removable assembly. Such a removable docking assembly would plug into an existing (universal or other) power outlet (or not), extend up to a desired height upon a wall adjacent to a charging location, and have an upper (or other) portion matching a height of the power receiver on the cart. The cart can be brought adjacent to such a docking assembly and be electrically charged by the docking assembly using one of the methodologies described above, or some other methodology.

With some carts, a battery is provided which is of a rechargeable and swappable nature. With this invention, the cart can be slightly modified (if necessary) to include recharging electronics onboard the cart, and with these recharging electronics coupled to the cart mounted power coupling of this invention. In this way, the cart can be anchored to the rail and also electrically connected for supplying power to recharge the rechargeable battery. If a cart is in use for a long period of time away from the rail, and the battery is running low on charge, the battery can be swapped with a new fully charged battery, so that the cart can continue to be used. With such a system, the benefits of anchoring a power supply through the rail are provided to the cart, as well as any existing benefits associated with a modular/swappable and rechargeable battery.

OBJECTS OF THE INVENTION

Accordingly, a primary object of the present invention is to provide an anchoring system which anchors a cart to an adjacent wall, such as to keep the cart from moving in an earthquake.

Another object of the present invention is to provide a medical cart which can be conveniently connected and released to a wall anchor, either when in use or when not in use.

Another object of the present invention is to provide a wall mounted power source for supplying power to a cart, either for operating the cart or for recharging a battery of the cart or for data communication to and from the cart.

Another object of the present invention is to provide a system and method that eliminates or reduces the need of "central charging stations" for swappable and/or modular (or rechargeable) batteries, by allowing charging from a rail on the wall at any of a variety of locations where the cart is likely to be used (or nearby).

Another object of the present invention is to provide a wall anchor for a cart, such as a medical cart, which also supplies power to the cart or a battery on the cart when the cart is connected to the wall anchor.

Another object of the present invention is to provide a medical cart which possesses a designated charging area for tablets, phones, and other personal mobile devices utilized in healthcare to allow for healthcare professionals to utilize the cart itself to charge their personal mobile devices wherever the cart is located.

Another object of the present invention is to provide a wall anchor with or without an associated power source for supplying power to the cart, which is continuous in a substantially horizontal direction at a constant height above a floor, so that a variety of locations are available for anchoring and optionally also supplying power to the cart.

Another object of the present invention is to provide a wall anchor through which a cart can be secured and optionally supply power, which wall anchor also acts as a handrail and/or wall protection bumper.

Other further objects of the present invention will become apparent from a careful reading of the included drawing figures, the claims and detailed description of the invention.

DESCRIPTION OF THE PREFERRED EMBODIMENT

Figure 1:
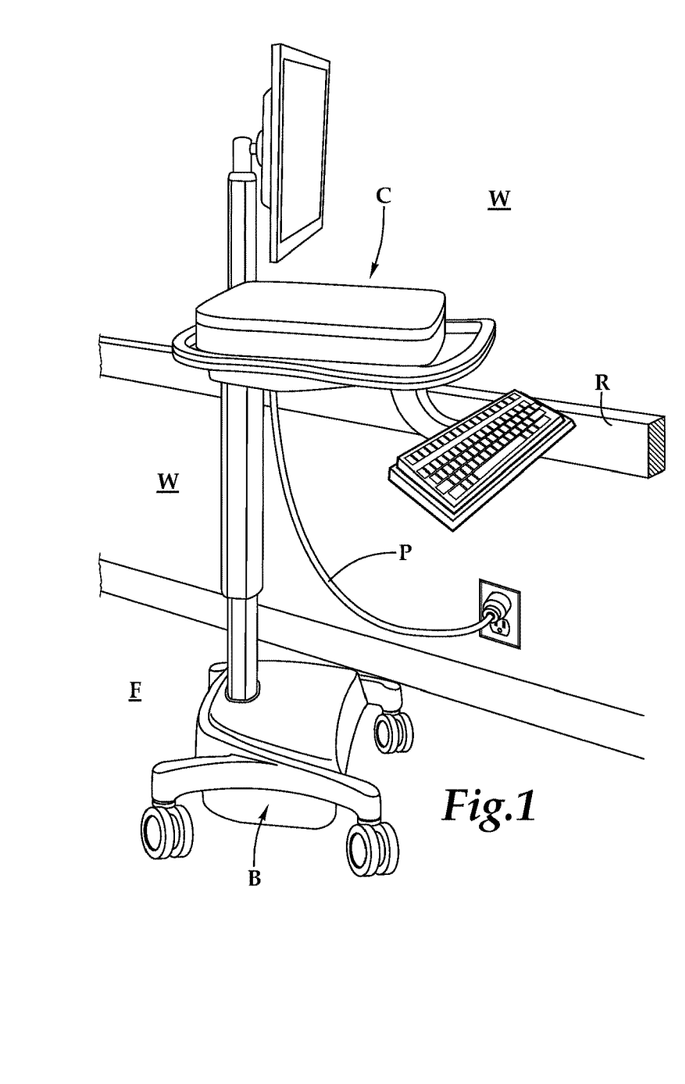
FIG. 1 is a perspective view of a prior art medical cart within a hallway, and showing how the cart in the prior art must be plugged in occasionally and has the potential to be randomly located in a less than optimal position.
Figure 2:
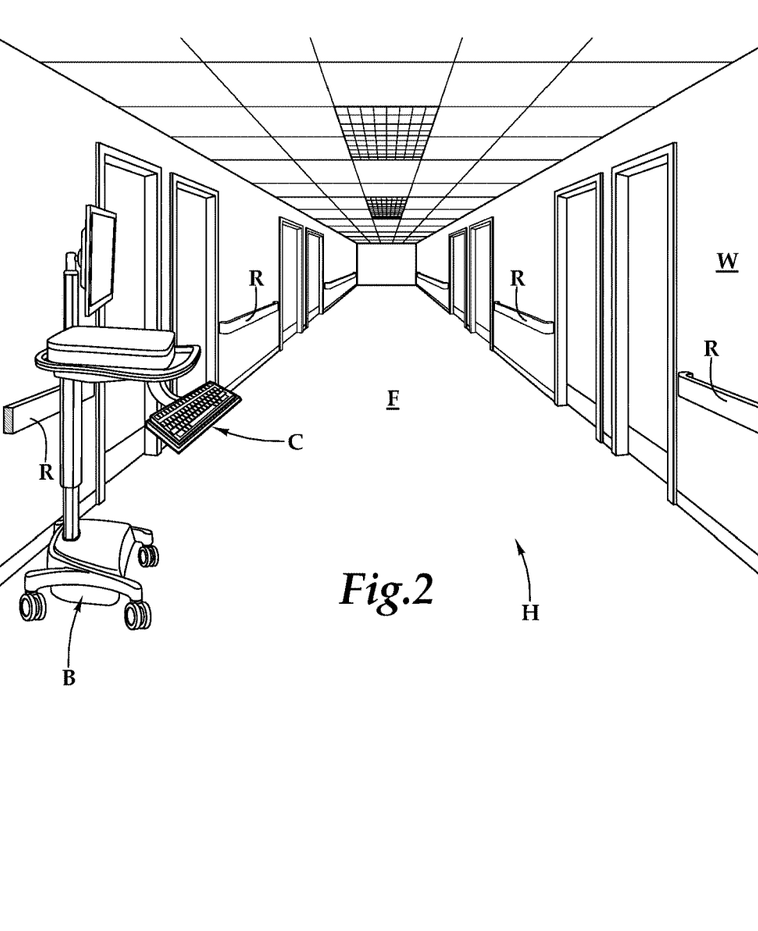
FIG. 2 is a perspective view of a hallway of a medical environment and showing how walls of the hallway in the prior art typically also include rails along the walls which act as a handrail and/or wall protection bumper, and illustrating how conveniently according to this invention such a rail can be replaced with a rail that provides for anchoring and/or power supply to a medical cart at a variety of continuous locations there along.
Figure 14:
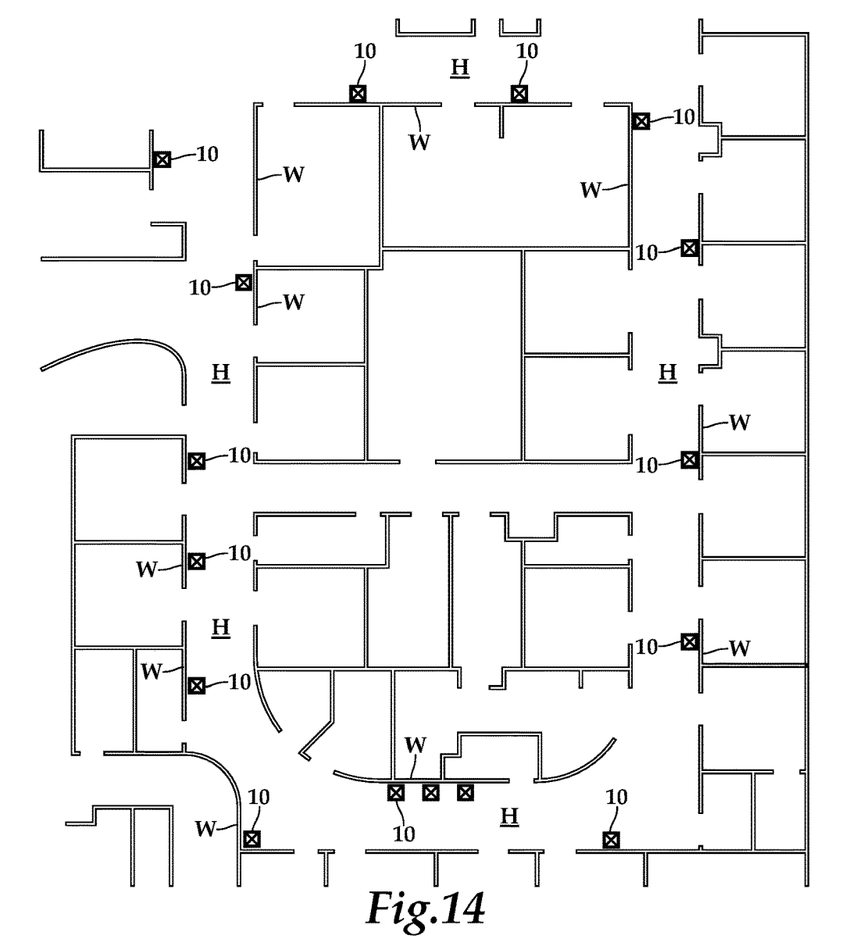
FIG. 14 is a top plan view of a floor plan of a healthcare facility, such as a hospital, and illustrating how hallways, walls and carts can be conveniently located a variety of places according to this invention, for anchoring and/or power supply to the carts.

Referring to the drawings, wherein like reference numerals represent like parts throughout the various drawing figures, reference numeral 10 is directed to a cart according to one embodiment which can utilize wall anchoring and/or recharging systems of this invention (FIGS. 3, 4, 7 and 10). The cart 10 can be any of a variety of carts 10 which are configured to move upon a floor F in a space such as a hallway H which is bounded by walls W (FIGS. 1, 2 and 14). An example of such a space where this invention would typically be utilized includes a healthcare facility such as a hospital, where the cart 10 is provided to facilitate some aspect of medical care. The system of this invention allows for anchoring of the cart 10 to a wall W and/or convenient recharging of the cart 10, for carts which utilize power consuming devices and/or which have batteries B therein.

In essence, and with particular reference to FIGS. 3-6, basic details of this invention are described, according to a first embodiment. The cart 10 is configured to include a power coupling 30 and an anchor 40 in embodiments which provide both anchoring and power delivery for the cart 10. In this embodiment, the power coupling 30 is located on an arm 20 which moves relative to the cart 10 (along arrow A of FIGS. 3 and 5 as well as along arrow D), both to engage the anchor 40 and to connect to the power coupling 30. The invention also includes a rail 50 or other structure, typically mounted to a wall W. The rail 50 optionally supplies power in a manner which can connect to the power coupling 30 for delivery of power to the cart 10 when the power coupling 30 of the cart 10 is brought adjacent to the rail 50. In various embodiments, the anchor 40 and handrail 50 can take on different forms to provide the cart 10 anchoring function. In various embodiments, the power coupling 30 and electrical portions of the rail 50 can be modified to achieve the delivery of power to the cart 10. In other embodiments, the invention can be simplified to merely provide power delivery to the cart 10 or to merely provide anchoring of the cart 10.

More specifically, and with particular reference to FIGS. 1 and 2, details of prior art carts C, and particularly those which are configured for use in a medical environment (such as a hospital), are described, as a basic item to which this invention is directed as an improvement. The cart 10 is typically provided on a wheeled base. Often a battery B is located at a lower portion of the base, as the battery B is heavy and adds stability to the cart C. The cart C rolls on the wheeled base upon a floor E Typically, this floor F is horizontal, flat and smooth, so that the cart C can be easily moved on the floor F even if the cart C is heavy. A power cord P is typically provided on the cart C which allows for the cart C to be plugged into a power outlet of the building in which the cart C is utilized. While some carts C do not have any power utilizing equipment, other carts C do include power utilizing equipment which can be powered directly from power supplied to the power cord P, or can be supplied from the battery B, with power from the power cord P merely recharging the battery B.

FIGS. 1 and 2 illustrate some drawbacks of prior art cart C management and recharging the cart C. While shown adjacent to one of the walls W, the cart C could be at any location within the hallway H, and provide an impediment to passage of personnel or other medical equipment through the hallway H, unless the cart C is "parked" close to one of the walls W. The cart C can be oriented somewhat diagonally rather than aligned with the wall W, so that its blockage of the hallway H is increased somewhat. To power the cart C, one must find a power outlet that is available and handle the power cord (which can be a contaminated item in many instances). Plugging in the cord P often requires exertion of significant force while stooped over, to either insert the power plug into the power outlet or remove the power plug in the power outlet. Furthermore, in an earthquake or other seismic event, the cart C has nothing to stop it from moving significantly and providing damage to individuals or equipment adjacent thereto, or to the cart C itself. The cart C also has the potential to tip over, further exacerbating the potential for such damage.

With this invention as described herein, the cart C is modified such as in the various embodiments disclosed herein, cart 10, 110, 210 (FIGS. 3, 4, 7 and 10) can be releasably anchored to the wall W, such is through the rail R along the wall W. In many embodiments of this invention, the rail 50 also acts as a power source and a power coupling 30 is provided on the cart 10 which is complementally located and formed to make an electric coupling with the power source associated with the rail 50, so that when the cart 10 is anchored to the rail 50, it is also plugged in for powering of the cart 10. The cart 10 can be used when so anchored, or can be anchored when not in use. Hence, when an earthquake or seismic event is experienced, the cart 10 is held safely against the wall W. Medical personnel are highly likely to dock the cart 10, 110, 210 to the wall W through the rail 50, as it ensures that the cart 10 will be charged up and ready for use when needed, so that medical personnel are incentivized to utilize the system of this invention, and the cart 10, 110, 210 is highly likely to be anchored when an unexpected seismic event occurs.

With particular reference to FIGS. 3-6, details of the cart 10 according to a first particular embodiment, as well as details of an associated rail 50, are described, which can implement this invention in one representative manner. This embodiment depicted in FIG. 3-6 is described in a manner providing both anchoring of the cart 10 to the wall W through the rail 50, and also providing for power transmission through the power coupling 30 to the cart 10. It is recognized that this embodiment could be modified to provide merely the anchoring function, such as for carts 10 which do not include power, or where power is being supplied in some other manner. Furthermore, it is conceivable that this embodiment could be configured to allow for docking and power charging, even if no anchoring to the wall W is specifically provided.

The cart 10 in this embodiment is shown with a display 19 carried on an upper mast 13. An upper platform 14 also extends from the upper mast 13. The upper platform 14 and display 12 are located above a body 15 from which the upper mask 13 extends upwardly. A lower platform 16 provides a horizontal surface beneath the upper platform 14 and generally extending horizontally from the body 15. A lower mast 17 extends down from lower platform 16 to a base 18. The base 18 typically contains a battery therein, but the cart 10 could be provided without a battery or the battery could be provided elsewhere.

Wheels 19 are typically provided on the base 18 for the cart 10 to be easily moved upon the floor F. It is conceivable that the cart 10 could be provided with skids or other supports rather than wheels 19, and still function according to this invention. This invention is contemplated as being adaptable to a variety of different carts 10, either by being built into the carts 10 originally, or being retrofitted onto the carts 10. Any details of the cart 10 depicted could be modified according to the design of the cart 10, to cause the cart 10 to be most effective for its intended purpose.

An arm 20 is provided on the cart 10 which is a movable element that is pivotably attached to a pivot 22 affixed to the cart 10, and most preferably on a rear of the lower mast 17 of the cart 10. This arm 20 pivots (along arrow A of FIGS. 3 and 5) to cause upper portions of the arm 20 including a power coupling 30 and anchor 40 thereon to come into and out of engagement with the rail 50 (see FIGS. 4-6). Such engagement occurs by rotation (along arrow A) but appears as a vertical motion (along arrow D of FIGS. 4 and 6) when viewed from a side angle.

The power coupling 30 in this embodiment includes connector blades 32 extending upward therefrom. These connector blades 32 are electrically connected to internal electric components within the cart 10, such as electric lines leading to the battery of the cart 10 for recharging of the battery, when the power coupling 30 is connected to a power source such as that within the rail 50. As perhaps best shown in FIG. 6, this power coupling 30 including the connector plate 32 is configured with three separate connector blades 32 which would typically be a positive connector blade 32, a negative connector blade 32 and a ground connector blade 32. In another embodiment, other configurations could be provided with different numbers of connector blades 32.

In one embodiment, at least one of the connector blades 32 is provided for hard wired data communication to and from the cart 10, rather than (or in addition to) only power transmission. For instance, the hospital can have a centralized database which contains patient medical records. Through such a data connector blade 32 (or connector blades) the cart 10 can access a patient medical record without requiring wireless connection. In some instances, such a hard wired connection might be preferable, such as for enhanced confidentiality.

Figure 3:
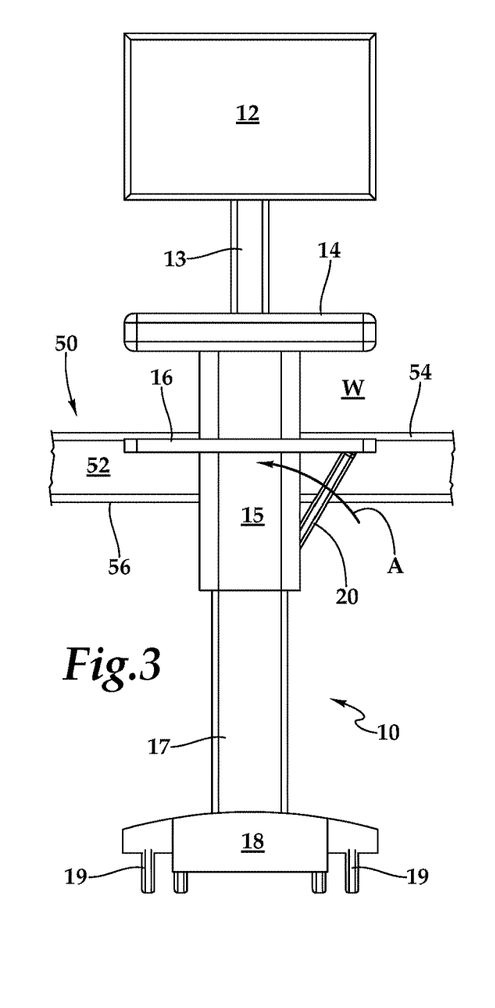
FIG. 3 is a front elevation view of a medical cart according to this invention and a portion of a rail according to this invention to provide a system for anchoring and/or power supply for the cart.
Figure 4:
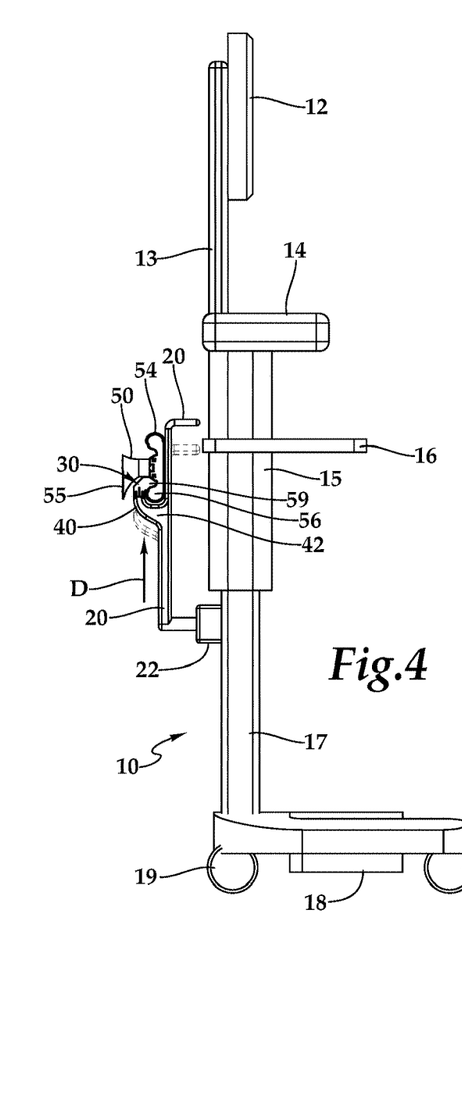
FIG. 4 is a side elevation view of that which is shown in FIG. 3.
Figure 5:
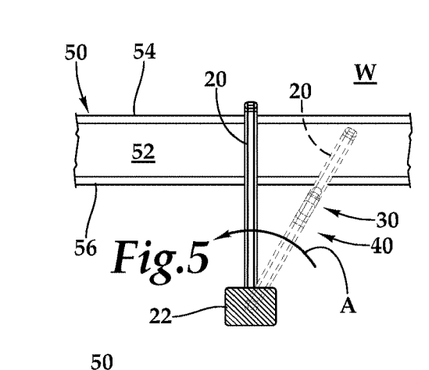
FIG. 5 is a front elevation detail of a portion of the cart and a portion of the rail, and illustrating how a pivoting arm can be brought into and out of contact with the rail for anchoring and optional power supply for the cart.

Pivoting of the arm 20 (along arrow A) can occur in a variety of ways. As one option, the arm 20 is merely manually pivoted by grasping the arm 20 and rotating it about the pivot 22. As an alternative, the arm 20 can be pivotably supported at the pivot 22, and also include a rotational input shaft axially aligned with this pivot point. Such a shaft could be caused it to rotate such as through an electric motor, such as a stepper motor, so that an operator would push a button on the cart 10 which would cause this motor to in turn caused the arm 20 to rotate. As a further alternative, this shaft could extend out of a front side of the cart 10, and could have a handle extending laterally from this shaft which could be gripped and turned. As a further alternative, linkages could be coupled to the shaft and extend down to near the bottom of the cart 10 and adjacent to the floor F, so that a foot pedal could be provided thereon and actuated by a foot of the user. Such a foot pedal actuation of the arm 20 might be preferable in circumstances where it is desirable to maintain sanitation of hands of an individual utilizing the cart 10.

In this embodiment, the arm 20 also supports the anchor 40. As one example, the anchor 40 includes a flange 42 extending rearwardly from the arm 20, and with a tip 44 of the flange 42 extending upwardly somewhat. In this particular embodiment, the connector blades 32 and power coupling 30 are both located on this tip 44 of the flange 42.

The rail 50 is configured to be complemental in form to the anchor 40, so that when the arm 20 is pivoted (along arrow A), the flange 42 and tip 44 are brought up into secure contact with lower portions of the rail 50, for securing of the cart 10 to the wall W through interaction of the flange 42 and tip 44 of the anchor 40 with lower portions of the rail 50.

In one embodiment, the rail 50 not only acts as a structure to which the anchor 40 can engage, but also acts as a handrail and has a bumper to protect the wall W. One such rail 50 includes a bumper face 52 which is preferably substantially planar and oriented in a vertical plane, and extending from a top grip 54 down to a lower lobe 56. The bumper face 52, top grip 54 and lower lobe 56 are all spaced slightly away from the wall W by a mount 55. Thus, the top grip 54 can be gripped by hand of a user. The lower lobe 56 can be provided with a form generally similar to that of the top grip 54, primarily for aesthetic reasons, or the lower lobe 56 can have some other configuration.

Preferably, an upper surface of the flange 42 of the anchor 40 is a complimentary form with that of the lower lobe 56, so that when the anchor 40 is elevated (by rotation of the arm 20 or by some other mechanism), surface contact is provided between the upper surface of the flange 42 and the lower lobe 56. Because the tip 44 of the flange 42 extends separately somewhat, this tip 44 ends up between the lower lobe 56 and the wall W, and beneath the mount 55. Thus, high forces acting on the cart 10, tending to move the cart 10 away from the wall W are resisted by the flange 42 and particularly the tip 44 of the flange 42, so that the cart 10 is held securely to the wall W through the rail 50.

A power source is provided within the rail 50. This power source can merely be positive, negative and ground contacts leading to an electric system within the building in which the rail 50 is located. In another embodiment, this power supply can be more self contained within the rail 50, and could even be a battery powered power source or other power source independent from other electric power systems. Most preferably a power bus 59 is located beneath the mount 55 and on a rear side of the lower lobe 56 between the wall W and the lower lobe 56. This power bus 59 preferably has an insulating outer surface, but includes recesses 58 therein that lead to conductive elements, which recesses 58 are sized to receive the connector blades 32 therein, but are preferably too small to allow fingers of an individual to reach therein, so that electric shock risk is minimized.

In the most preferred embodiment, the power bus 59 is continuous between ends of the rail 50. The recesses 58 are also preferably continuous between ends of the rail 50. The recesses 58 preferably have a standard spacing away from the wall W and a standard spacing relative to the flange 42 and tip 44 which correspond with position of the connector blades 32. With such a standardized form and continuous form, the power coupling 30 of the cart 10 can provide an electrical connection between the power source of the rail 50 and power systems within the cart 10, by docking to the rail 50 at any location on the rail 50, rather than specific locations on the rail 50.

Similarly, the rail 50, and especially the lower lobe 56 of the rail 50 preferably has a continuous cross-sectional form and maintains a constant height above the floor F. Thus, the anchor 40 including the flange 42 and tip 44 will come into firm engagement with the lower lobe 56 or other portions of the rail 50 regardless of where the cart 10 engages with the rail 50. As a result, a user of the cart 10 need not find a particular location for anchoring and recharging of the cart 10. Rather, the user can merely locate the cart 10 adjacent to any portion of the rail 50, and then actuate the arm 20 (along arrow A) to achieve both anchoring and power connection.

Figures 7, 8:
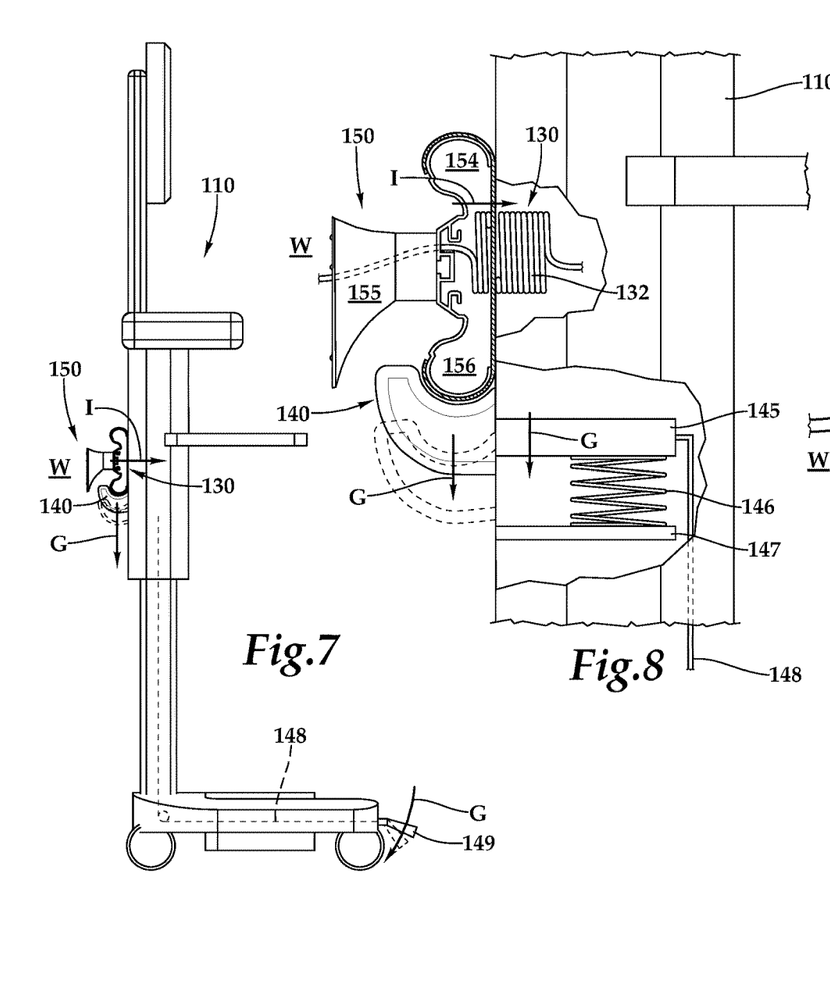
FIG. 7 is a side elevation view of an alternative embodiment of that which is shown in FIGS. 3-6.
FIG. 8 is a detail of a portion of that which is shown in FIG. 7, and with portions cut away, and illustrating how inductive contactless power transmission can be provided according to one embodiment of this invention, and showing details of an anchor according to this embodiment of the invention.
Figure 9:
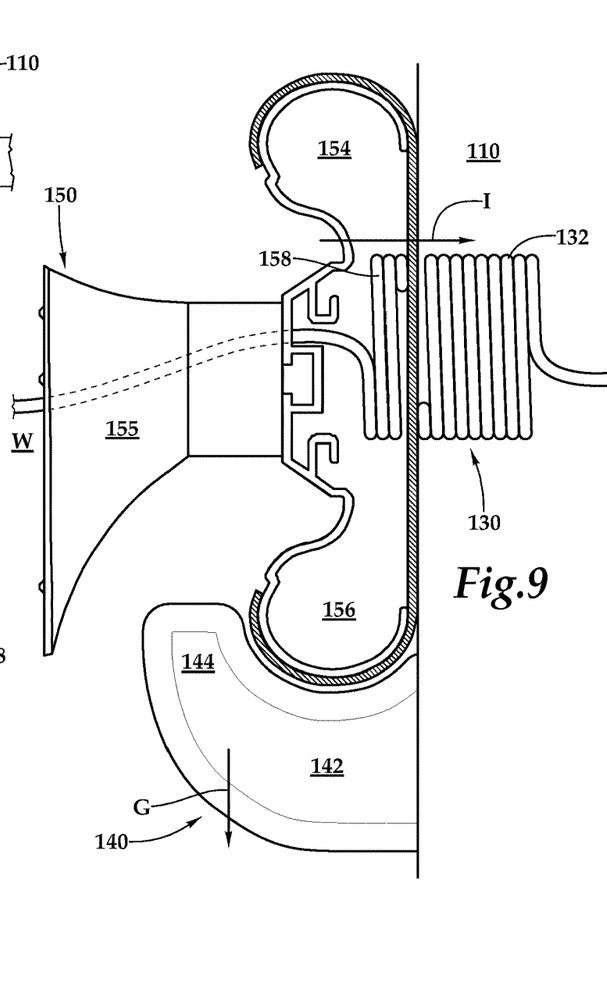
FIG. 9 is a detail of a portion of that which is shown in FIG. 8, further revealing details of the contactless inductive power transfer from the rail to the cart, according to one embodiment of this invention.
Figure 10:
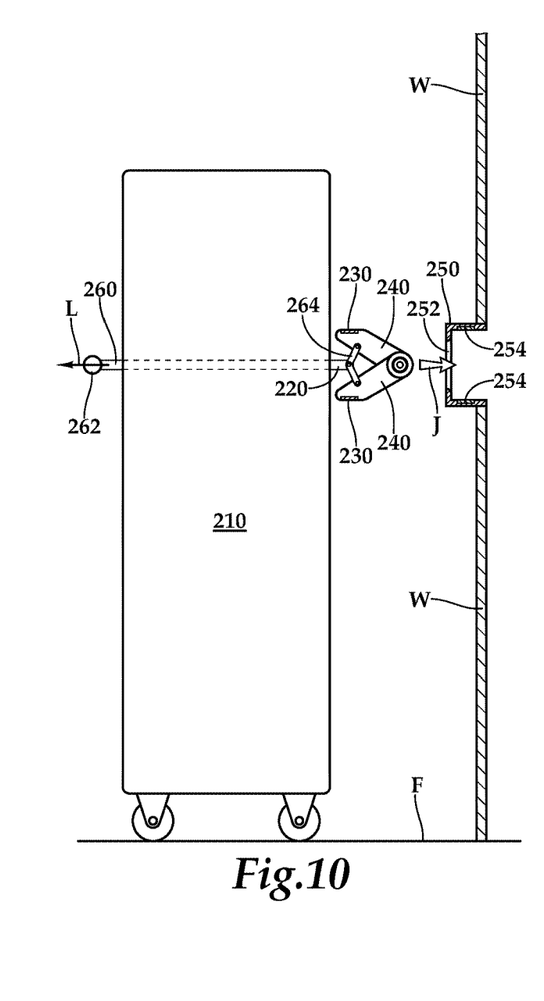
FIG. 10 is a side elevation view of a further alternative embodiment of that which is shown in FIGS. 3-6, illustrating a cart more generally and an alternative anchoring and rail (or docking assembly) system, which can anchor the cart and optionally also supply power to the cart.

With particular reference to FIGS. 7-9, details of an alternative cart 110 are described, along with modifications to other associated systems according to an embodiment where power transfer to the cart 10 occurs by an inductive power coupling 130 and an inductive rail 150, so that a physical electrical connection is not required in this embodiment. Details of this embodiment shown in FIGS. 7-9 are similar to those in the previous embodiment described and shown in FIGS. 3-6, except where particularly distinctly identified herein. An inductive power coupling 130 is provided with an associated coil 132. This inductive power coupling 130 interacts with an inductive power coil 158 located within an inductive rail 150 mounted to the wall W. Inductance between the inductive power coil 158 and the coil 132 of the inductive power coupling 130 on the alternative cart 110 allows for power transfer from the power supply associated with the wall W or inductive rail 150 to the alternative cart 110.

An anchor 140 is preferably provided in the form of a flange 142 extending from a rear of the cart 110, and with a tip 144 extending upward from the flange 142. Most preferably, this anchor 140 is distinct from the anchor 40 of the cart 10 in FIGS. 1-6, in that it only purely moves vertically upward and downward, rather than pivoting (along arrow G of FIGS. 7-9). In particular, this flange 142 is preferably supported by a support base 145 which can move vertically upward relative to a reference surface 147 within the cart 110. A spring 146 is interposed between the support base 145 and the reference surface 147 which biases the support base 145 and associated flange 142 in an upward position where it engages the inductive rail 150. In particular, the inductive rail 150 preferably is similar to the rail 50 of the embodiment of FIGS. 1-6, with a bumper face 152, top grip 154, mount 155 and a lower lobe 156. Other configurations could be provided for the geometry of inductive rail 150. The spring 146 causes the flange 142 to be biased toward an elevation where it engages the lower lobe 156 of the inductive rail 150 for securing of the cart 110 to the wall W through the rail 150.

An actuator 148 extends from the support base 145 to a foot pedal 149. Actuator 148 (such as a cable) can move the support base 145 downward, compressing the spring 146. Force is applied to the foot pedal 149, and acting through the actuator 148 can cause the support base 145 to move downwardly and for the spring of 146 to be compressed. Such motion is depicted in FIGS. 7-9. With the foot pedal 149 depressed, the cart 110 can be freely moved relative to the wall W and inductive rail 150. When the foot pedal 149 is not depressed, the spring 146 causes the flange 142 to be in an elevated position and engaging the lower lobe 156 of inductive rail 150, so that the cart 110 is anchored to the wall W through the rail 150.

Furthermore, a rearmost portion of the flange 142 can be beveled slightly, so that if the cart 110 is merely pushed hard against the rail 150, the spring 146 can be compressed and the flange 142 moved downward enough to move under and engage the lower lobe 156 of the inductor rail 150. When the cart 110 has been moved all the way against the rail 150, the spring 146 will elevate the flange 142 to fully engage the anchor 140 with the rail 150. Thus, a user need not even depress the foot pedal 149 to allow the cart 110 to be locked against the rail 150, but can merely push the cart 110 against the rail 150 with sufficient force to allow the anchor 140 to engage the rail 150. The foot pedal 149 can still be used to release the anchor 140 and for movement of the cart 110 away from the rail 150, in at least some embodiments.

Figure 15:
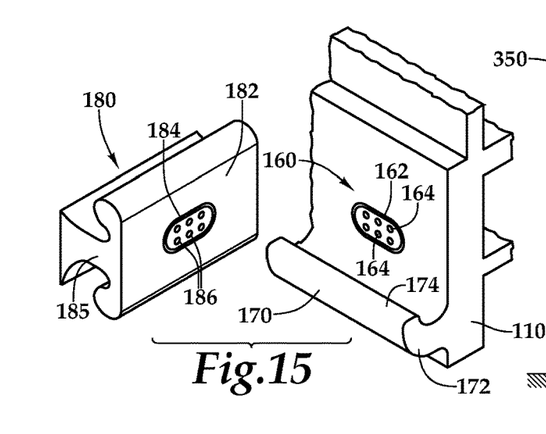
FIG. 15 is a perspective view of a further alternative embodiment of this invention where a magnetic contact power transfer system can be associated with a rail and anchor according to a further embodiment of this invention, for both anchoring and power supply to the cart through the rail.

With particular reference to FIG. 15, details of a modification to the alternative cart 110 and associated embodiment are disclosed. In this modified embodiment, the inductive power coupling 130 is replaced with a magnetic power coupling 160. The magnetic power coupling 160 includes a magnet 162 which preferably has a perimeter form and a series of contacts 164 inboard of this perimeter magnet 162. An anchor 170 is provided with a flange 172 and tip 174 which can be similar to those described above in FIGS. 7-9, associated with the inductive power coupling 130, anchor 140 and inductive rail 150.

A magnetic power rail 180 is provided for complementary use with the magnetic power coupling 160 on an appropriately modified alternative cart 110. This magnetic power rail 180 includes a bumper face 182 which is generally oriented within a planar vertical manner. A magnet 184 is provided with a perimeter form, and with contacts 186 inboard of this perimeter magnet 184. A mount 185 spaces the magnetic power rail 180 from an associate of wall W. The magnets 162, 184 are preferably provided with a complementary form. As one example, the shapes are both oval, with one magnet slightly smaller in size than the other, so that one magnet nests inside of the other.

The contacts 164, 186 are preferably similarly sized and spaced to reach other and provided at a surface so that these contacts can come into contact with each other to form an electrical connection therebetween, when the magnets have been registered together. While the magnets are shown with a continuous form, they could have discreet portions thereof which are actually active magnetically and other portions thereof which are not active magnetically with being active magnetically meaning being either a magnet or being ferromagnetic. In this embodiment, the cart 110 would be brought adjacent to the rail 180. A user would need to get the magnetic power coupling on the cart 110 close enough to the associated mating portions at a discreet location on the magnetic power rail 180 that the magnets would attract each other with sufficient force to pull each other together and to make electric contact between the various contacts 164, 186. Thus, this variation of the embodiment associated with the alternative cart 110 is somewhat self-aligning, but not entirely continuous in form, and some alignment horizontally is required to provide the power/recharging function for the cart 110.

Most preferably, the anchoring junction can occur at any location along the rail 180. As a further alternative, the magnetic power coupling 160 associated with the cart 110 could be mounted in a manner which allows the magnetic power coupling 160 on the cart 110 to float horizontally somewhat. For instance, the magnetic power coupling 160 could be provided on a sliding base which allows the magnetic power coupling to slide horizontally. After anchoring of the cart 110 to the rail 180 utilizing the anchor 170, a user could then utilize this sliding feature to slide the magnetic power coupling 160 laterally sufficient to allow the associated magnets 162, 184 to provide sufficient attractive force to complete the registration therebetween to engage contacts 164, 186 to complete the connection.

One benefit of this magnetic power coupling 160 and magnetic power rail 180, is that a cart 110 can be to some extent a breakaway cart 110, in that if someone were to crash into the cart 110, it could easily disconnect by overcoming this magnetic force, and no damage would be done to the cart 110. Similarly, the spring 146 (FIG. 8) can facilitate such a breakaway function, so the cart can be disconnected from the rail 150 merely by applying sufficient forces pushing the cart 110 away from the railing 50, and without damaging the cart 110. Most preferably, status lights are provided on the cart 110 which show its status as being coupled to electric power and/or properly anchored, such as to resist seismic forces.

With particular reference to FIGS. 10-13, details of a second alternative embodiment cart 210 and associated equipment are described for providing anchoring and/or power connection for the cart 210. In this embodiment, the cart 210 includes an arm 220 extending from a rear of the cart 210. This arm 210 terminates at power contacts 230 which are preferably located upon wings 240 which are pivotably attached to the arm 220 through pivot 242 and a torsion spring 244. The arm 220 is configured to pass into a slot 252 in a clasp rail 250. This clasp rail 250 can have a cross-sectional form similar to that of other rails 50, 150 described in detail above, such as to provide a handrail function, or can merely be provided as an anchor to the wall W, as generally depicted herein.

The slot 252 is preferably elongate in form and extends horizontally into a face of this clasp rail 250. The slot 252 is large enough to allow the wings 240 to pass therethrough, when the wings 240 are collapsed together somewhat (along arrow K of FIGS. 12 and 13). However, once the wings 240 pass through the slot 252, the torsion spring 244 extends the wings 240 laterally outward, causing power contacts 230 on tips of the wings 240 to come into contact with power pads 250 inside of the clasp rail 250, and make electric contact. In addition, the power pads 254 could provide data transmission as described in various embodiments above.

The wings 240 preferably engage the clasp rail 250 inside of the slot 252 and prevent the cart 210 from moving away from the clasp rail 250, unless a release 260 is actuated. In particular, the release 260 connects to the arm 220 and has a knob 262 at an end thereof. The knob 262 can be pulled, and links 264 between the arm 220 and the wings 240 are caused to pull the wings 250 toward each other, overcoming force of the torsion spring 244. With the wings 240 pivoting toward each other somewhat, they can fit out of the slot 252 to allow for the wings 240 to release the clasp rail 250 and for the cart 210 to be free of the clasp real 250.

Figure 11:
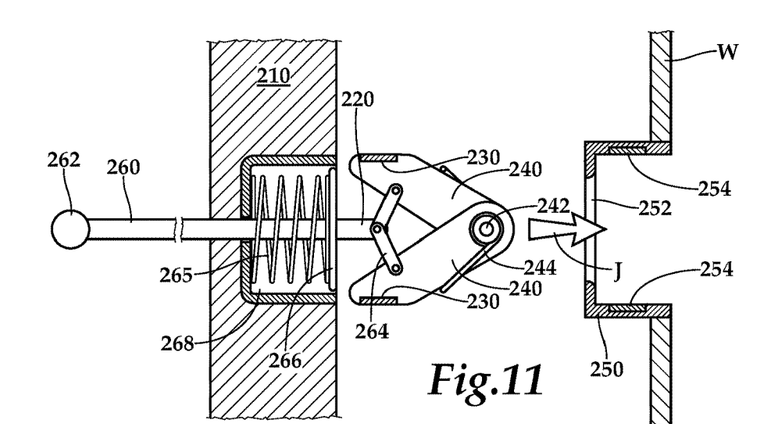
FIG. 11 is a detail of a portion of that which is shown in FIG. 10 and with portions cut away illustrating how the anchor and power coupling occurs according to this embodiment of the invention.
Figure 12:
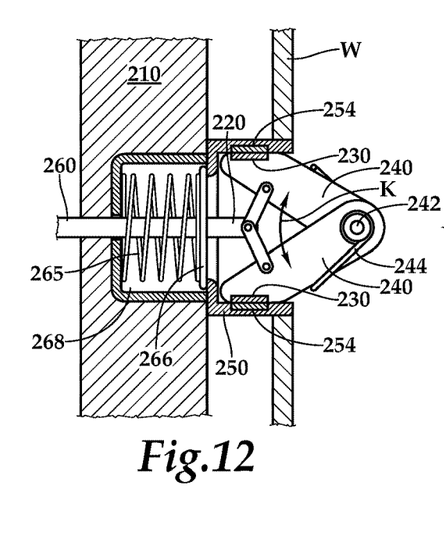
FIGS. 12 and 13 are further detailed sectional views similar to FIG. 11, but illustrating further steps in securing the cart to the wall through the anchor, and releasing the anchor for removal of the cart from the wall, according to this embodiment of the invention.
Figure 13:
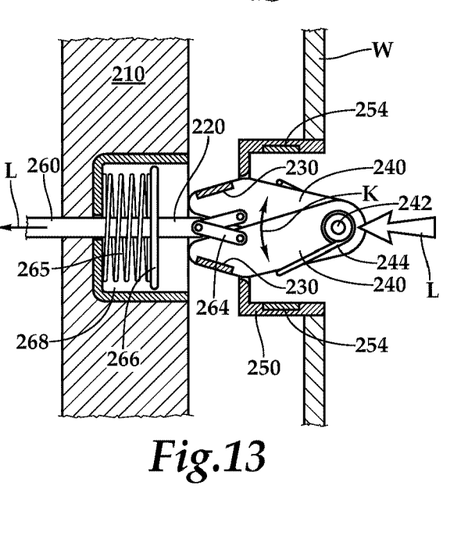

Most preferably, a spring 265 is located within a well 268 on a rear of the cart 210 and surrounding the arm 220. A reference plate 266 is located so that the spring 265 is between portions of the well 268 and the reference plate 266, so that when the release 260 is pulled, the spring 265 is compressed. Then, when the release 260 is no longer provided with a tension force (along arrow L of FIG. 10) the spring returns the wings 240 to their original position under force of the torsion spring on the wings 240, along arrow K (FIGS. 11-13). Motion of the wings 240 into the slot 250 of the clasp rail 250 is illustrated along arrow J, while removal of the wings 240 from the clasp rail 250 is provided along an arrow opposite that of arrow J. Most preferably, the power pads 254 within the clasp rail 250 are sufficiently far from the slot 252 so that fingers of an individual cannot reach into the interior of the clasp rail 250 and make contact with the power pads 254, or at least not make contact to both of the power pads 254, to close a connection therebetween.

With particular reference to FIG. 14, a floor plan of a medical facility such as a hospital is illustrated, where hallways H have carts 10 therein, and with walls W filled with appropriate rails so that the carts 10 can be held to the walls W and powered, for both safe anchoring and ensuring that the carts 10 are all fully charged when needed. The rails on the walls W would typically be continuous between ends thereof, such as extending between doorways. With a constant cross-sectional form at a constant height above a floor of the hallway, the carts 10 can be easily docked to a portion of the wall W where desired.

Figures 16, 17:
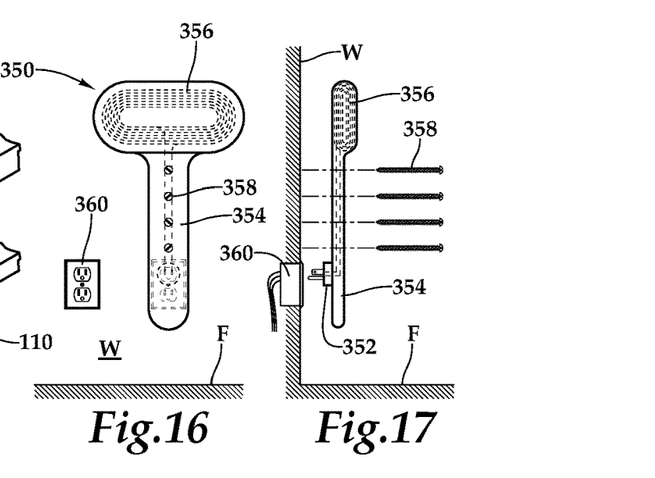
FIG. 16 is a front elevation view of an inductive power supply system which can be retrofitted onto a wall and provide contactless charging to a medical cart, in embodiments with or without anchoring associated therewith.
FIG. 17 is a side elevation view of that which is shown in FIG. 16.

With particular reference to FIGS. 16 and 17, a wall W retrofit structure is provided in the form of an inductive power retrofit wall attachment 350. The attachment 350 has a male plug 352 at a lower end 344 that can fit into a power outlet 360. The lower end 354 leads up to an inductive power output coil 356 similar to the inductive power coil 158 (FIG. 9). A cart 110 can be parked next to this attachment 350 and receive power through an inductive power coupling 130 thereon (FIG. 9). Fasteners 358 allow for securing the attachment 350 to the wall W. If desired, a length of rail, such as inductive rail 150, can be provided so that this retrofit attachment 350 can provide both anchoring and charging.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When embodiments are referred to as "exemplary" or "preferred" this term is meant to indicate one example of the invention, and does not exclude other possible embodiments. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A cart anchoring and powering system for a mobile cart used upon a floor with walls adjacent thereto, the system comprising in combination:
   a rail, said rail mountable to the wall at a height above the floor suitable to allow at least portions of said rail to also function as a hand rail;
   an anchor on the cart;
   said anchor releasably engaging said rail to selectively hold the cart to the wall;
   a power source coupled to said rail;
   a power coupling on the cart and aligned for power transfer with said power source when said anchor is engaging said rail; and
   wherein said power coupling is located upon said anchor, said anchor including a flange extending from a rear of the cart and with a tip extending upward from a distal portion of said flange.

2. The cart anchoring and powering system of claim 1 wherein said anchor is located at a height matching said height of said rail above the floor, so that said anchor on the cart is aligned with said rail vertically.

3. The cart anchoring and powering system of claim 2 wherein said rail is elongate in form and horizontal with said floor, with said power source coupled to said rail having multiple laterally spaced locations for engagement with said power coupling on said cart.

4. The cart anchoring and powering system of claim 3 wherein said power source is continuous in a lateral direction between ends of said rail, for engagement with said power coupling on the cart, such that no horizontal alignment is required for power transfer from said power source to the cart.

5. The cart anchoring and power system of claim 1 wherein said power source of said rail includes an inductive power output, and wherein said cart power coupling includes an inductive power input, said inductive power input located in an overlapping height with said inductive power outlet when said anchor of the cart engages said rail.

6. The cart anchoring and powering system of claim 1 wherein said rail includes a top grip which is grip-able by a hand of a user.

7. The cart anchoring and powering system of claim 6 wherein said top grip is spaced from the wall by a mount attached to the wall.

8. A cart anchoring and powering system for a mobile cart used upon a floor with walls adjacent thereto, the system comprising in combination:
   a rail, said rail mountable to the wall at a height above the floor suitable to allow at least portions of said rail to also function as a hand rail;
   an anchor on the cart;
   said anchor releasably engaging said rail to selectively hold the cart to the wall;
   a power source coupled to said rail;
   a power coupling on the cart and aligned for power transfer with said power source when said anchor is engaging said rail; and
   wherein said power coupling is located upon said anchor, said anchor including a flange extending from a rear of the cart and with a tip extending upward from a distal portion of said flange.

9. The cart anchoring and powering system of claim 8 wherein said rail includes a lower lobe, said flange and said tip sized and shaped to extend to a side of said lower lobe opposite the cart and at least partially up above a lowermost portion of said lobe, for engagement of said lower lobe of said rail by said flange, said flange movable for releasable engagement of the cart to said rail through said flange and said lower lobe.

10. A cart anchoring and powering system for a mobile cart used upon a floor with walls adjacent thereto, the system comprising in combination:
   a rail, said rail mountable to the wall at a height above the floor suitable to allow at least portions of said rail to also function as a hand rail;
   an anchor on the cart;
   said anchor releasably engaging said rail to selectively hold the cart to the wall;
   a power source coupled to said rail;
   a power coupling on the cart and aligned for power transfer with said power source when said anchor is engaging said rail; and
   wherein said power coupling of said cart is coupled to said anchor, said anchor including at least one pivotable wing extending from a rear of the cart, and with said rail including a slot on a side of said rail opposite the wall, said slot sized to receive said wing therethrough for anchoring of the cart to said rail and for transfer of power between the power source of said rail and the cart.

11. A cart anchoring system for a mobile cart used upon a floor with walls adjacent thereto, the system comprising in combination:
a rail, said rail mountable to the wall at a height above the floor suitable to allow at least portions of said rail to also function as a hand rail;
an anchor on the cart;
said anchor releasably engaging said rail to selectively hold the cart to the wall;
a power source coupled to said rail;
a power coupling on the cart and aligned for power transfer with said power source when said anchor is engaging said rail; and
wherein said power coupling is located upon said anchor, said anchor including a flange extending from a rear of the cart and with a tip extending upward from a distal portion of said flange.

12. The system of claim 11 wherein said anchor is located at a height matching said height of said rail above the floor.

13. The system of claim 11 wherein said rail is elongate in form and horizontal with said floor, with the cart couple-able to said rail at multiple laterally spaced locations for engagement with said anchor of the cart, such that less horizontal alignment is required for securing the cart to the wall.

14. The system of claim 11 wherein a power source is coupled to said rail, and a power coupling is attachable to the cart and aligned for power transfer between the power source of said rail and the cart when said anchor is engaged with said rail.

15. The system of claim 14 wherein said power source is continuous in a lateral direction between ends of said rail, for engagement with said power coupling on the cart, such that no horizontal alignment is required for power transfer from said power source to the cart.

16. The system of claim 14 wherein said power source of said rail includes an inductive power output, and wherein the power coupling on the cart includes an inductive power input, said inductive power input located an overlapping height with said inductive power outlet, when said anchor of the cart engages said rail.

17. The system of claim 11 wherein said rail includes a top grip which is grip-able by a hand of a user.

18. The system of claim 17 wherein said top grip is spaced from the wall by a mount attached to the wall.

19. A cart anchoring system for a mobile cart used upon a floor with walls adjacent thereto, the system comprising in combination:
a rail, said rail mountable to the wall at a height above the floor suitable to allow at least portions of said rail to also function as a hand rail;
an anchor on the cart;
said anchor releasably engaging said rail to selectively hold the cart to the wall;
wherein a power source is coupled to said rail, and a power coupling is attachable to the cart and aligned for power transfer between the power source of said rail and the cart when said anchor is engaged with said rail; and
wherein said power coupling is located upon said anchor, said anchor including a flange extending from a rear of said cart and with a tip extending upward from a distal portion of said flange.

20. The system of claim 19 wherein said rail includes a lower lobe, said flange and said tip sized and shaped to extend to a side of said lower lobe opposite the cart and at least partially up above a lowermost portion of said lobe, for engagement of said lower lobe of said rail by said flange, said flange movable for releasable engagement of the cart to said rail through said flange and said lower lobe.

21. A cart anchoring system for a mobile cart used upon a floor with walls adjacent thereto, the system comprising in combination:
a rail, said rail mountable to the wall at a height above the floor suitable to allow at least portions of said rail to also function as a hand rail;
an anchor on the cart;
said anchor releasably engaging said rail to selectively hold the cart to the wall;
wherein a power source is coupled to said rail, and a power coupling is attachable to the cart and aligned for power transfer between the power source of said rail and the cart when said anchor is engaged with said rail; and
wherein said power coupling of the cart is coupled to said anchor, said anchor including at least one pivotable wing extending from a rear of the cart, and with said rail including a slot on a side of said rail opposite the wall, said slot sized to receive said wing therethrough for anchoring of the cart to said rail and for transfer of power between the power source of said rail and the cart.

22. A method for anchoring a cart to a wall alongside to a floor upon which the cart is located, the method including the steps of:
moving the cart upon the floor until an anchor on the cart is adjacent to a rail on the wall at a height above the floor suitable to allow at least portions of the rail to also function as a hand rail;
securing the cart to the rail through the anchor;
a power source coupled to said rail;
a power coupling on the cart and aligned for power transfer with said power source when said anchor is engaging said rail; and
wherein said power coupling is located upon said anchor, said anchor including a flange extending from a rear of the cart and with a tip extending upward from a distal portion of said flange.

23. The method of claim 22 including the further steps of:
activating a release associated with the anchor to cause the anchor to release the rail; and
moving the cart away from the rail.

24. The method of claim 23 wherein said placing step includes the rail having a power source located thereon; and
electrically connecting a power coupling of the cart to the power source of the rail when the anchor is engaging the rail during said securing step, such that said securing step can both secure the cart to the rail and supply power from the power source of the rail to the cart and/or personal mobile devices electrically connected to the cart.

25. The method of claim 22 wherein said moving step includes the rail having a top grip which is grip-able by a hand of a user.

26. The method of claim 25 wherein said moving step includes the top grip being spaced from the wall by a mount attached to the wall.

\* \* \* \* \*